(12) United States Patent
Tateishi et al.

(10) Patent No.: US 9,423,808 B2
(45) Date of Patent: Aug. 23, 2016

(54) DC TO DC CONVERTER WITH PSEUDO CONSTANT SWITCHING FREQUENCY

(71) Applicant: Texas Instruments Incorporated, Dallas, TX (US)

(72) Inventors: Tetsuo Tateishi, Nagoya Aichi (JP); Shinobu Aoki, Kita-Nagoya Aichi (JP)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 623 days.

(21) Appl. No.: 13/893,877

(22) Filed: May 14, 2013

(65) Prior Publication Data

US 2013/0249516 A1 Sep. 26, 2013

Related U.S. Application Data

(60) Division of application No. 12/367,384, filed on Feb. 6, 2009, now Pat. No. 8,476,887, which is a continuation-in-part of application No. 11/256,869, filed on Oct. 24, 2005, now Pat. No. 7,652,461.

(60) Provisional application No. 60/632,921, filed on Dec. 3, 2004.

(51) Int. Cl.
| | | |
|---|---|---|
| *G05F 1/46* | (2006.01) | |
| *H02M 3/158* | (2006.01) | |
| *H02M 1/44* | (2007.01) | |
| *H02M 1/00* | (2006.01) | |

(52) U.S. Cl.
CPC ............. *G05F 1/46* (2013.01); *H02M 3/1588* (2013.01); *H02M 1/44* (2013.01); *H02M 2001/0032* (2013.01); *Y02B 70/1466* (2013.01); *Y02B 70/16* (2013.01)

(58) Field of Classification Search
CPC .......... H02M 1/44; H02M 2001/0032; H02M 3/156; H02M 3/158; H02M 3/1582; H02M 3/1588; H02M 2003/1552; G05F 1/46
See application file for complete search history.

(56) References Cited

U.S. PATENT DOCUMENTS

| | | | |
|---|---|---|---|
| 4,683,529 A | 7/1987 | Bucher, III | |
| 5,180,964 A | 1/1993 | Ewing | |
| 5,627,460 A * | 5/1997 | Bazinet | G05F 1/618 323/224 |
| 5,764,495 A | 6/1998 | Faulk | |

(Continued)

OTHER PUBLICATIONS

"Complete DDR, DDR2 and DDR3 Memory Power Solution Synchronous Buck Controller, 3-A LDO, Buffered Reference," TPS51116 Data Sheet, May 2004, Revised Jun. 2008, www.ti.com, USA, pp. 1-41.

(Continued)

*Primary Examiner* — Jessica Han
(74) *Attorney, Agent, or Firm* — William B. Kempler; Frank D. Cimino

(57) ABSTRACT

A method for a DC to DC converter with a pseudo constant switching frequency is disclosed herein. For example, some embodiments provide a DC to DC converter having a switch connected to a switching node to control a voltage of the switching node, and a switching controller that is adapted to turn on and off the switch at a substantially constant frequency based at least in part on the voltage of the switching node. The switching controller includes a modulator connected to a control electrode of the switch and that is adapted to actuate and deactuate the switch, and a first timer that is connected to the switching node and to the modulator. The first timer uses the voltage of the switching node to determine an on-time for the switch.

4 Claims, 4 Drawing Sheets

(56) References Cited

U.S. PATENT DOCUMENTS

| | | |
|---|---|---|
| 6,212,079 B1 | 4/2001 | Balakrishnan et al. |
| 6,956,361 B1 | 10/2005 | Mozipo et al. |
| 7,005,836 B1 * | 2/2006 | Rice .................... H02M 3/156 323/283 |
| 7,023,192 B2 | 4/2006 | Sutardja et al. |
| 7,202,609 B2 | 4/2007 | Langeslag et al. |
| 7,417,879 B2 | 8/2008 | Sawtell |
| 7,443,148 B2 | 10/2008 | Weng |
| 7,482,793 B2 | 1/2009 | Stoichita |
| 7,492,133 B2 | 2/2009 | Yoshikawa |
| 7,576,529 B2 | 8/2009 | Ishino |
| 8,054,056 B2 * | 11/2011 | Coleman ................. H02M 1/08 323/224 |
| 2009/0096511 A1 * | 4/2009 | Ueunten .............. H03K 17/122 327/543 |

OTHER PUBLICATIONS

"Dual D-CapTM Synchronous Step-Down Controller for Notebook Power Rails," TPS51427 Data Sheet, Apr. 2008, Revised Sep. 2008, www.ti.com, USA, pp. 1-41.

* cited by examiner

US 9,423,808 B2

DC TO DC CONVERTER WITH PSEUDO CONSTANT SWITCHING FREQUENCY

CROSS REFERENCE TO RELATED APPLICATION

This application is a divisional of U.S. patent application Ser. No. 12/367,384, filed Feb. 6, 2009, entitled "DC TO DC CONVERTER WITH PSEUDO CONSTANT SWITCHING FREQUENCY," which is a continuation-in-part of U.S. patent application Ser. No. 11/256,869, entitled "High Efficiency Power Converter Operating Free of an Audible Frequency Range" and filed on Oct. 5, 2005 (now U.S. Pat. No. 7,652,461, issued Jan. 26, 2010), which claims prior to U.S. Patent Application Ser. No. 60/632,921, entitled "High Efficiency DC/DC Converter Operating Out of an Audible Frequency Range" and filed on Dec. 3, 2004. This application also claims priority to U.S. Provisional Patent Application No. 61/077,792, entitled "ON-TIME GENERATION CIRCUIT FOR PSEUDO FIXED FREQUENCY DC/DC CONVERTER BASED UPON SWITCHING NODE INFORMATION" and filed on Jul. 2, 2008. The aforementioned applications are assigned to an entity common hereto, and the entirety of the aforementioned applications are each incorporated herein by reference for all purposes.

BACKGROUND

Many types of electronic systems use DC to DC converters to provide electrical power, particularly portable battery powered devices that require a lower or higher voltage than is directly supplied by the batteries or by other electronic systems requiring multiple voltage levels internally. DC-DC converters process an incoming direct current (DC) voltage and generate an output of a different voltage. DC to DC converters may also regulate the output voltage so that input voltage variations and changing load conditions do not substantially alter the output voltage. A number of different types of DC to DC converters are known, such as buck converters and boost converters.

Many of these are switching regulators, which rapidly switch on and off to transfer packets of energy from an input to an output. The duty cycle of the switching can be controlled to adjust the output voltage, and various circuit configurations are known to provide outputs with higher or lower voltage than the input. Switching regulators are typically very efficient, but have some characteristics to be controlled or minimized such as output voltage ripple. Because of the switching nature of these DC to DC converters, the output voltage may have some ripple despite the use of filters at the output. Stable, or predictable, switching frequency is preferred to simplify selection of such output filter components.

Some examples of prior art systems are U.S. Pat. No. 6,212,079; U.S. Pat. No. 7,202,609; and U.S. Pat. No. 5,764,495.

SUMMARY

Various apparatuses, methods and systems for a DC to DC converter with a pseudo constant switching frequency are disclosed herein. For example, some embodiments provide a DC to DC converter having a switch connected to a switching node to control a voltage of the switching node, and a switching controller that is adapted to turn on and off the switch at a substantially constant frequency based at least in part on the voltage of the switching node. The switching controller includes a modulator connected to a control electrode of the switch and that is adapted to actuate and deactuate the switch, and a first timer that is connected to the switching node and to the modulator. The first timer uses the voltage of the switching node to determine an on-time for the switch.

Other embodiments provide methods of converting DC to DC signals, including averaging a voltage of a switching node in a DC to DC converter to generate a representation of a boundary voltage, and switching the switching node between a first voltage level and a second voltage level based at least in part upon the representation of the boundary voltage so that the switching node is switched at a substantially constant frequency. In some embodiments of the methods, the DC to DC converter comprises a buck converter, the boundary voltage comprises an output voltage and the switching node comprises a node between a high side switch and a low side switch. In other embodiments of the methods, the DC to DC converter comprises a boost converter, the boundary voltage comprises an input voltage and the switching node comprises a node between a first switch to an output node and a second switch to ground. Various embodiments of the methods also include charging an energy storage device during an on-time and discharging the energy storage device during an off-time, wherein the energy storage device is charged with a current that is proportional to a difference between an input voltage level and a voltage level across a high side switch. The methods also include comparing the representation of the output voltage with a voltage level of the energy storage device, wherein the switching node is switched when a result of the comparing changes state. In various embodiments of the methods, the charging is terminated when the voltage level of the energy storage device reaches a termination voltage level or a combination of the output voltage and a voltage level across an output inductor. The termination voltage level may also include the voltage level across a low side switch.

Yet other embodiments provide a DC to DC buck converter having a high side switch and a low side switch connected in series between an input voltage and a lower reference voltage, with a switching node between the high side and low side switch. The input of a low pass filter is connected to the switching node. An inductor is connected between the switching node and an output node. The input of a switching controller is connected to the low pass filter output, and the output is connected to control inputs on the high and low side switches. The switching controller is not directly connected to the output node. The switching controller is adapted to turn on and off the at least one switch at a substantially constant frequency based at least in part on the low pass filter output. The switching controller is adapted to place the DC to DC buck converter in an on state with the high side switch on and the low side switch off, and in an off state with the high side switch off and the low side switch on. An on-time during which the DC to DC buck converter is in the on state is proportional to an output voltage of the output node and is inversely proportional to the input voltage. The switching controller includes a comparator with a first input connected to the low pass filter output and a second input connected to a reference voltage generator. The switching controller input is connected to the comparator output. The reference voltage generator includes a capacitor connected between the second input of the comparator and ground. The reference voltage generator also includes a bypass transistor connected in parallel with the capacitor. The switching controller is adapted to turn on the bypass transistor during off-time. The reference voltage generator also includes a reference current source connected to the second input of the comparator. The current level from the reference current source is proportional to a voltage which represents the switch node voltage during an on-time. The reference voltage generator also includes a precharging transistor connected between the second input of the comparator and the switching node. The switching controller is adapted to turn on the precharging transistor during at least a portion of the off time to charge the capacitor to a voltage level of the switching node during the off-time.

This summary provides only a general outline of some particular embodiments. Many other objects, features, advantages and other embodiments will become more fully apparent from the following detailed description, the appended claims and the accompanying drawings.

BRIEF DESCRIPTION OF THE DRAWINGS

A further understanding of the various embodiments may be realized by reference to the figures which are described in remaining portions of the specification. In the figures, like reference numerals may be used throughout several drawings to refer to similar components.

DESCRIPTION

The drawings and description, in general, disclose various embodiments of DC to DC converters with pseudo constant switching frequency. The switching frequency is controlled by a switching controller in the DC to DC converters based upon feedback from the switching node, without a direct connection to the output node. In various embodiments of integrated circuit DC to DC converters, the switching node is connected to a pin on the integrated circuit, to which external filtering components such as inductors, resistors and capacitors may be added. The use of feedback from the switching node to establish the pseudo constant switching frequency avoids the need to provide a pin on the integrated circuit for direct feedback from the output node at the far end of the external filtering components.

Figure 1:
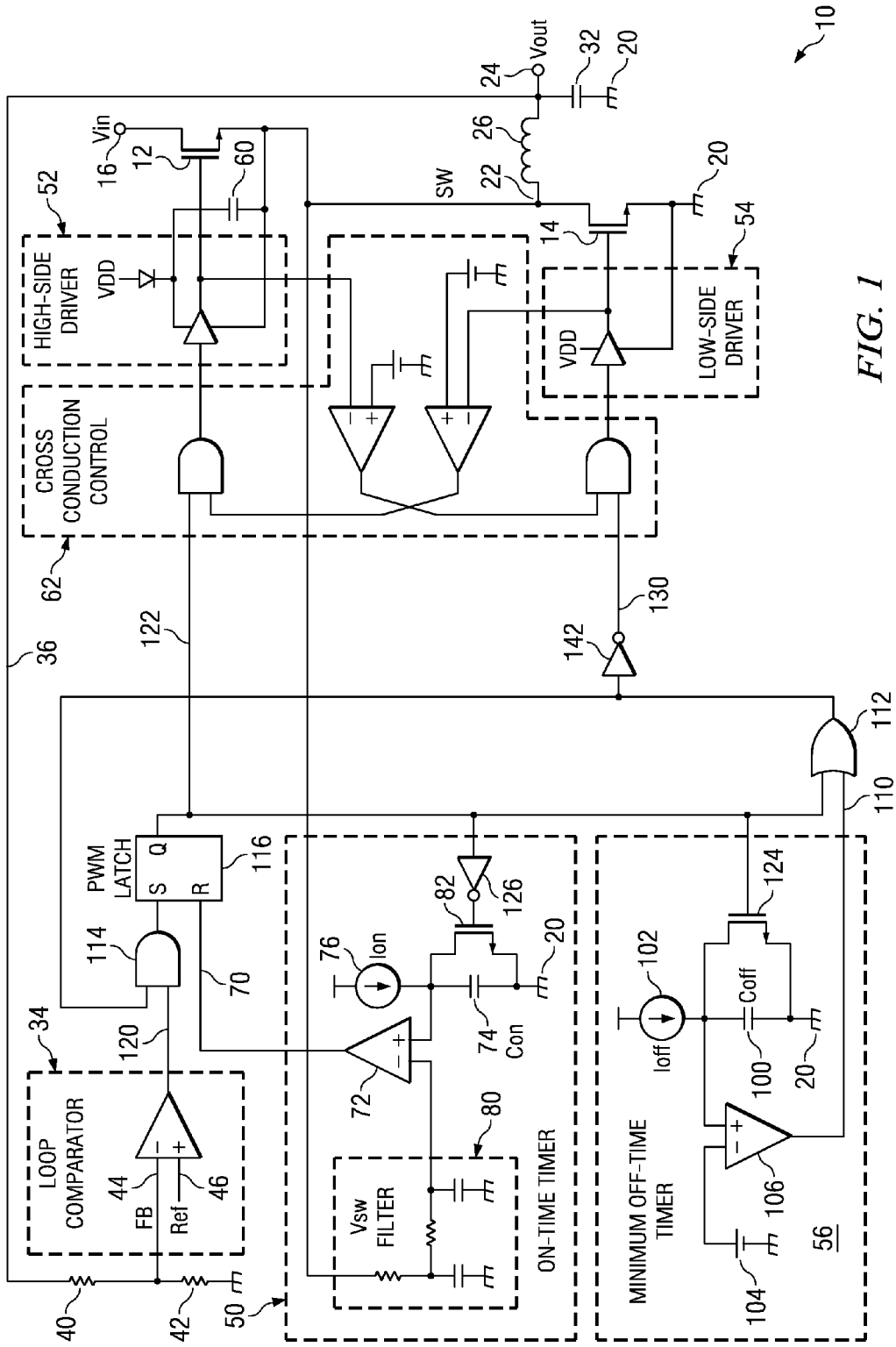
FIG. 1 depicts an example of a DC to DC buck converter with a pseudo constant switching frequency.

Referring now to FIG. 1, an example of a DC to DC buck converter 10 will be described. A high side switch 12 and a low side switch 14 are connected in series between an input Vin 16 and ground 20, with a switching node 22 between the high side switch 12 and the low side switch 14. An output Vout 24 is connected to the switching node 22 through an output filter. For example, the output filter may include an inductor 26 connected between the switching node 22 and the output Vout 24, and capacitor 32 connected in series between the output Vout 24 and ground 20. Note that in some integrated circuit embodiments, the high side switch 12 and the low side switch 14 are integrated components on the integrated circuit and the switching node 22 is at an output pin of the integrated circuit, and the inductor 26 and capacitor 32 are external components. In these embodiments, the output Vout 24 is not accessible inside the integrated circuit without providing an input pin on the integrated circuit for feedback from the output Vout 24. Thus, integrated circuit DC to DC converters that rely on feedback from the output Vout to establish a pseudo constant switching frequency would require an extra pin on the integrated circuit.

The DC to DC buck converter 10 of FIG. 1 establishes a pseudo constant switching frequency for the switching node 22 based on feedback from the switching node 22 rather than from the output Vout 24. During an on-time, the high side switch 12 is turned on and the low side switch 14 is turned off, allowing current to flow from the input Vin 16 to the output Vout 24 through the inductor 26. During an off-time, the low side switch 14 is turned on and the high side switch 12 is turned off. The output filter 26 and 32 averages the voltage at the switching node 22, creating a DC voltage at the output Vout 24 that is lower than at the input Vin 16. A loop comparator 34 in the DC to DC buck converter 10 begins each on-time based on a feedback signal 36 from the output Vout 24. The voltage of the feedback signal 36 is divided in an external voltage divider made up of an upper resistor 40 and a lower resistor 42. Generally, resistors 40 and 42 in an integrated circuit DC to DC buck converter 10 are external components, provided by the user of the integrated circuit to set the desired voltage level at the output Vout 24. Thus, the voltage level at the output Vout 24 is generally not available without an external feedback pin on the integrated circuit. When the divided feedback voltage 44 falls below a reference voltage 46, the loop comparator 34 starts the on-time. An on-time timer 50 ends the on-time after a period calculated to maintain a substantially constant switching frequency, or pseudo constant frequency.

The DC to DC buck converter 10 may contain various other components as desired, such as a high-side driver 52 and low side driver 54 used to drive the high side switch 12 and low side switch 14, respectively. If an NMOS transistor is used as the high side switch 12, a minimum off-time timer 56 may be provided to charge a drive capacitor 60 used to power the high-side driver 52. In the absence of a minimum off-time timer 56, the overall off-time is established by loop comparator 34. The drive capacitor 60 is powered during each off-time, and the minimum off-time timer 56 ensures that the DC to DC buck converter 10 remains in the off-time sufficiently long to charge the drive capacitor 60 for the next on-time. A cross-conduction controller 62 may be provided, ensuring that the high side switch 12 and low side switch 14 are never turned on at the same time.

The operation of the on-time timer 50 in establishing a pseudo constant switching frequency will now be described. Assuming that the resistance of the high side switch 12 and the low side switch 14 and the parasitic DC resistance (DCR) of the inductor 26 are all low enough to be ignored, the output capacitance 32 is large enough and the voltage of the output Vout 24 can be considered to be constant, the following equations can be derived:

$$I1 = I0 + Ton^*(Vin - Vout)/L \quad (1)$$

$$I2 = I1 - Toff^*Vout/L \quad (2)$$

Where
I0: inductor current at beginning of an on-time
I1: inductor current at the end of the on-time
I2: inductor current at the end of the off-time
Ton: duration of on-time
Toff: duration of off-time L: inductance of inductor 26
Vin: voltage at the input Vin 16
Vout: voltage at the output Vout 24

During steady state operation, the current I2 through the inductor 26 at the end of the off-time should equal the current I0 through the inductor 26 at the beginning of the on-time, giving the following equations:

$$Ton*(Vin-Vout)=Toff*Vout \quad (3)$$

$$Ton+Toff=Ton*Vin/Vout \quad (4)$$

According to equation (4), it is possible to keep the switching period (Ton+Toff) constant by changing Ton proportional to Vout and inversely proportional to Vin. Voltage Vin is also generally representative of the voltage of the switching node voltage during the on state. Relationships between various voltages and states are described and claimed herein, such as proportionalities between various voltages and state durations. These relationships may be established without directly accessing the referenced nodes. For example, the DC to DC buck converter 10 establishes an on-time Ton that is proportional to Vout without directly accessing the output node, and that is inversely proportional to Vin without accessing the input node. Thus, statements of proportionality and other relationships made in the claims or description herein do not imply a direct connection to the cited nodes.

Referring again to FIG. 1, the on-time timer 50 generates an on-time termination signal 70 that ends the on-time. The on-time is generated using a comparator 72, a capacitor Con 74 and a charging current from a current source 76 which is proportional to the input voltage of the power stage at input Vin 16. The capacitor Con 74 is discharged to ground 20 during an off-time. Once an on-time is initiated by the loop comparator 34, the capacitor Con 74 is charged by the current from the current source 76. The comparator 72 monitors the voltage of the capacitor Con 74 and asserts the on-time termination signal 70 to terminate the on-time when the voltage of the capacitor Con 74 reaches a reference voltage. If a feedback path from the output Vout 24 were provided, the comparator 72 would compare the voltage of the capacitor Con 74 with the voltage of the output Vout 24 and terminate the on-time when the voltage of the capacitor Con 74 reaches the voltage at the output Vout 24. This would cause the on-time to be a function of the voltage at the input Vin 16 and the voltage at the output Vout 24, with the on-time proportional to the input Vin 16 and inversely proportional to the output Vout 24. The switching period or frequency would thus become constant over a range of Vin and Vout values in steady state, achieving a pseudo constant switching frequency.

The pseudo constant switching frequency may be achieved without direct feedback from the output Vout 24 by using feedback from the switching node 22 and considering the on resistance of the high side switch 12 and the low side switch 14 and the parasitic resistance of the inductor 26. Using the switch node voltage even provides more accurate and stable frequency to load current change compared to conventional method of using input voltage or output voltage directly. Equations (1) and (2) are modified as follows:

$$I1=I0+Ton*(Vin-Vout-Von1-Vdcr1)/L \quad (5)$$

$$I2=I1-Toff*(Vout+Von2+Vdcr2)/L \quad (6)$$

Where
Von1: average voltage across high side switch 12 during on-time
Von2: average voltage across low side switch 14 during off-time
Vdcr1: average voltage across DCR of inductor 26 during on-time
Vdcr2: average voltage across DCR of inductor 26 during off-time During steady state operation, the current I2 through the inductor 26 at the end of the off-time should equal the current I0 through the inductor 26 at the beginning of the on-time. Also, the average voltage Vdcr1 across the DCR of inductor 26 during the on-time should be the same as the average voltage Vdcr2 across the DCR of inductor 26 during the off-time because the average current during the on-time is equal to the average current during the off-time through the inductor 26. The following equations are therefore derived from equations (5) and (6):

$$Ton*(Vin-Von1-Vout-Vdcr)=Toff*(Vout+Vdcr+Von2) \quad (7)$$

$$Ton+Toff=Ton*(Vin-Von1+Von2)/(Vout+Vdcr+Von2) \quad (8)$$

Where
Vdcr=Vdcr1=Vdcr2

Thus the capacitor Con 74 is charged with a current proportional to (Vin−Von1+Von2), and the on-time is terminated when the voltage across the capacitor Con 74 reaches (Vout+Vdcr+Von2) to achieve pseudo fixed frequency operation.

The voltage of (Vin−Von1) may be obtained from the voltage at the switching node 22 when the high side switch 12 is on. The voltage of (Vout+Vdcr) may be obtained by averaging the voltage at the switching node 22 for an entire switching period Ton+Toff. Note that Vout can be used as a representative of (Vout+Vdc) if the Vdcr is small enough compared to Vout. The averaging of the voltage at the switching node 22 for an entire switching period is performed by a Vsw (switching node voltage) filter 80 connected between the switching node 22 and the comparator 72. The voltage of (−Von2) may be obtained from the voltage at the switching node 22 when the low side switch 14 is on. Thus, all the voltage information required for pseudo fixed frequency on-time generation may be obtained from the voltage at the switching node 22. In many applications, Von2 is low enough compared with Vin and Vout to be ignored. By ignoring Von2, the following approximate equation is derived from equation (8):

$$Ton+Toff=Ton*(Vin-Von1)/(Vout+Vdcr) \quad (9)$$

Based upon equation (9), a pseudo on-time generation algorithm is obtained as follows:
Discharge capacitor Con 74 to 0V during off-time
Charge capacitor Con 74 during on-time with a current proportional to (Vin−Von1)
Terminate on-time when the voltage on capacitor Con 74 becomes (Vout+Vdcr)

The DC to DC buck converter 10 of FIG. 1 implements this pseudo on-time generation algorithm. During an off-time, a discharging transistor 82 is turned on to discharge the capacitor Con 74 to ground 20. During the on-time, the capacitor Con 74 is charged with a current proportional to (Vin−Von1) from the current source 76. The on-time is terminated by the comparator 72 when the voltage on the capacitor Con 74 reaches (Vout+Vdcr) as generated by the Vsw filter 80. The Vsw filter 80 is a low pass filter that may be implemented in any desired manner, such as the two resistor, two capacitor example shown in FIG. 1, or with more or less resistors or capacitors, or any other desired implementation including even active filters. The time constant of the Vsw filter 80 is selected to be large enough against the switching period of the DC to DC buck converter 10 to achieve a stable voltage for the comparator 72.

Figure 2:
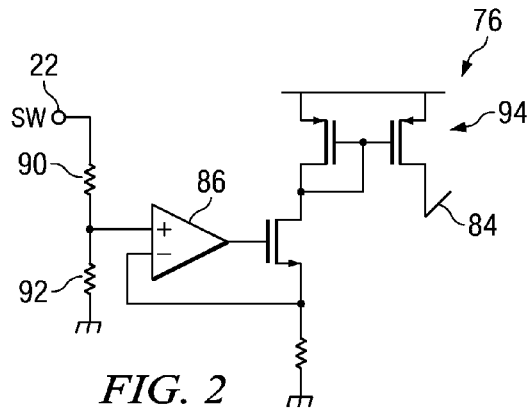
FIG. 2 depicts a reference current source that may be used in the DC to DC buck converter of FIG. 1.

One example of a current source 76 that produces an output 84 proportional to (Vin−Von1) is illustrated in FIG. 2. Because the voltage at the switching node 22 becomes (Vin−Von1) during the on-state, the amplifier 86 connected as a voltage follower produces an output current that is proportional to the voltage at the switching node 22. A voltage divider including an upper resistor 90 and lower resistor 92 may be used to sample the voltage at the switching node 22 before buffering in the voltage follower amplifier 86. The current from the amplifier 86 is mirrored by a current mirror 94. The voltage divider 90 and 92, voltage follower amplifier 86 and current mirror 94 all operate in a linear fashion, so the current output 84 of the current source 76 is proportional to the voltage of the switching node 22. It is possible to connect the resistor 90 to Vin instead of the switch node when (Von1) is small enough compared to (Vin).

Referring again to FIG. 1, the operation of the DC to DC buck converter 10 will be described in more detail. An on-time may be initiated by the loop comparator 34 after a minimum off-time as set by the minimum off-time timer 56. (Note that the DC to DC buck converter 10 is not limited to any particular embodiment of a minimum off-time timer 56, and that the minimum off-time timer 56 illustrated in FIG. 1 is just one example.) The minimum off-time may be detected when a capacitor Coff 100 is charged by a reference current source 102 to match a reference voltage 104. After the minimum off-time, a comparator 106 asserts the output 110 of the minimum off-time timer 56 which passes through an OR gate 112 to an AND gate 114 at the Set input of an SR latch 116. The output 120 of the loop comparator 34 is combined with the output 110 of the minimum off-time timer 56 in the AND gate 114 at the input of the SR latch 116. Thus, after the minimum off-time timer 56 has measured the minimum off-time and when the loop comparator 34 detects that the voltage at the output Vout 24 has fallen below a reference voltage 46, the Set input of the SR latch 116 is asserted to begin an on-time. The output 122 of the SR latch 116 is thus asserted, turning on the high side switch 12 and turning off the low side switch 14. The output 122 of the SR latch 116 also drives a discharging transistor 124 in the minimum off-time timer 56, discharging the capacitor Coff 100 to ground 20 when the on-time begins. The output 122 also drives the discharging transistor 82 in the on-time timer 50 through an inverter 126, so that during an off-time, the capacitor Con 74 is discharged to ground 20 and during an on-time, the discharging transistor 82 is turned off allowing the capacitor Con 74 to be charged by the current source 76.

During the on-time, the voltage at the switching node 22 is pulled up to a positive value of (Vin−Von1) to drive current through the inductor 26 to the output Vout 24. The capacitor Con 74 in the on-time timer 50 is charged by the current source 76 with a current proportional to (Vin−Von1). When the voltage on the capacitor Con 74 reaches (Vout+Vdcr), the average voltage of the switching node 22 across an entire switching period as generated by the Vsw filter 80, a pulse is produced on the on-time termination signal 70 from the on-time timer 50. The on-time termination signal 70 is connected to the Reset input of the SR latch 116, turning off the output 122 of the SR latch 116. This turns off the high side switch 12. This also turns off the discharging transistor 124 in the minimum off-time timer 56, allowing the capacitor Coff 100 to be charged by the reference current source 102. This also turns on the discharging transistor 82 in the on-time timer 50, discharging the capacitor Con 74 to ground 20 and ending the pulse on the on-time termination signal 70, allowing the next on-time to be started by the loop comparator 34 and minimum off-time timer 56 as described above. Note, however, that the low side switch 14 is not immediately turned on at the end of the on-time.

For certain low voltage applications, Von2 is not small enough with respect to Vout to be ignored, but is small enough with respect to Vin to be ignored. Given this assumption, the following approximate equation may be derived from equation (8):

$$Ton+Toff=Ton*(Vin-Von1)/(Vout+Vdcr+Von2) \quad (10)$$

Based upon equation (10), a pseudo on-time generation algorithm is obtained as follows:

- Discharge capacitor Con 74 to 0V during off-time
- Charge capacitor Con 74 during on-time with a current proportional to (Vin−Von1)
- Terminate on-time when the voltage on capacitor Con 74 becomes (Vout+Vdcr+Von2)

Figure 3:
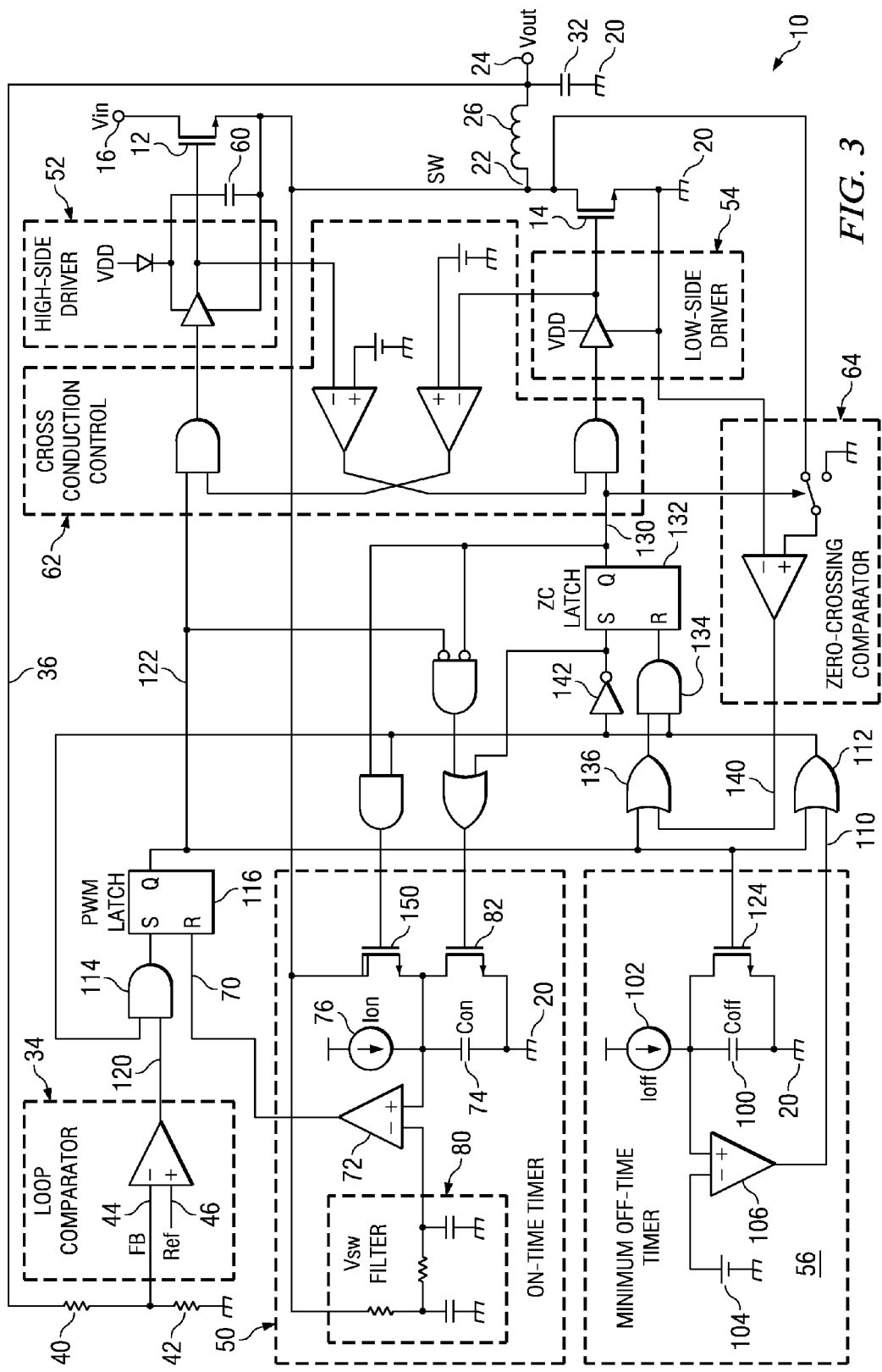
FIG. 3 depicts an example of a DC to DC buck converter with a pseudo constant switching frequency that takes into consideration off-time low side switch voltage.

The DC to DC buck converter 10 of FIG. 3 implements this pseudo on-time generation algorithm. The DC to DC buck converter 10 of FIG. 3 operates in much the same manner as that of FIG. 1. When the off-state is initiated by the on-time timer 50, the discharging transistor 82 is turned on and the capacitor Con 74 is discharged to ground 20. However, after the minimum off-time, which is generated by the minimum off-time timer 56, the discharging transistor 82 is turned off and a precharging transistor 150 is turned on to precharge the capacitor Con 74 to (−Von2).

In an embodiment corresponding to the DC to DC buck converter 10 of FIG. 3 in which zero crossing is not detected. In this embodiment, the timing of the DC to DC buck converter 10 is adapted so that the inductor current is not allowed to reach zero so that no zero crossing is detected. In this embodiment, the capacitor Con 74 is left at a precharged level of (−Von2). Again, the DC to DC buck converter 10 of FIG. 3 operates in much the same manner as that of FIG. 1. When the off-state is initiated by the on-time timer 50, the discharging transistor 82 is turned on and the capacitor Con 74 is discharged to ground 20. After the minimum off-time, which is generated by the minimum off-time timer 56, the discharging transistor 82 is turned off and a precharging transistor 150 is turned on to precharge the capacitor Con 74 to (−Von2). The current through the inductor 26 decreases but does not reach zero in this embodiment, so no zero-crossing is detected. The capacitor Con 74 thus reaches about (−Von2) during the off time. Once the loop comparator 34 initiates the on-time, the precharging transistor 150 is turned off and the high side switch 12 is turned on. Because the switching node 22 becomes (Vin−Von1) during the on-time, the current source 76 in the on-time timer 50 becomes proportional to (Vin−Von1). The voltage of the switching node 22 is filtered by the Vsw filter 80 to settle at a voltage of (Vout+Vdcr). The comparator 72 in the on-time timer 50 generates a pulse on the on-time termination signal 70 and terminates the on-time when the voltage on the capacitor Con 74 reaches (Vout+Vdcr). However, because the capacitor Con 74 started the on-time at about (−Von2), the entire voltage change on capacitor Con 74 before it reaches (Vout+Vdcr) is (Vout+Vdcr+Von2). In this embodiment, the on-time is therefore proportional to (Vout+Vdcr+Von2) and inversely proportional to (Vin−Von1).

In another embodiment corresponding to the DC to DC buck converter 10 of FIG. 3 a zero crossing is detected. As with the DC to DC buck converter 10 of FIG. 1, the current through the inductor 26 decreases and becomes zero, and the voltage at the switching node 22 rises above ground 20. The zero-crossing comparator 64 detects this zero crossing and turns off the low side switch 14 through the zero crossing SR latch 132. At the same time, the precharging transistor 150 is turned off and the discharge switch 82 is turned on and maintains the voltage across the capacitor 100 at zero. Because the switching node 22 becomes (Vin−Von1) during the on-time, the current source 76 in the on-time timer 50 becomes proportional to (Vin−Von1). The voltage of the switching node 22 is filtered by the Vsw filter 80 to settle at a voltage of (Vout+Vdcr). The comparator 72 in the on-time timer 50 generates a pulse on the on-time termination signal 70 and terminates the on-time when the voltage on the capacitor Con 74 reaches (Vout+Vdcr). In this embodiment, the on-time is proportional to (Vout+Vdcr) and inversely proportional to (Vin−Von1). In this case, the Von2 is zero because the current through the inductor 26 becomes zero, so (Vout+Vdcr) is actually equal to (Vout+Vdcr+Von2).

In one particular embodiment, referring to portions of FIG. 3, precharging transistor 150 may be included in a DC to DC converter as an error compensator to compensate for (−Von2) in the equations set forth herein, without including the Vsw filter 80. This improves the switching frequency stability while minimizing the die area of the DC to DC converter by omitting the Vsw filter 80 in the buck converter of FIG. 3. Similarly, a precharging transistor 150 may be used in a boost converter without filtering the feedback from the switching node.

Figure 4:
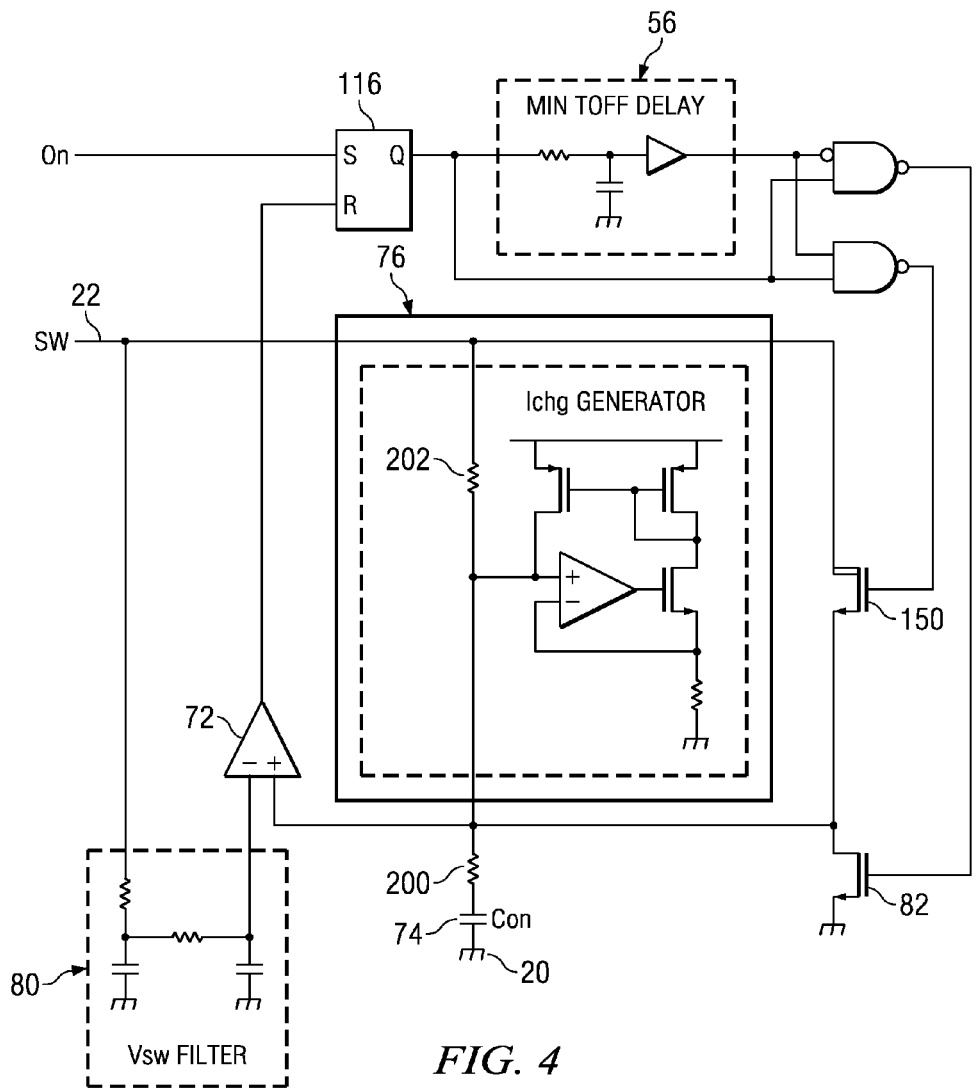
FIG. 4 depicts an example of various portions of another DC to DC buck converter with a pseudo constant switching frequency.

Various elements of another embodiment of a DC to DC buck converter 10 are illustrated in FIG. 4, including portions of the on-time timer 50. Specifically, this embodiment includes a resistor 200 connected in series with the capacitor Con 74 to compensate for circuit delays such as in comparators, drivers, external MOSFETS, etc, thereby reducing frequency dependency on the input Vin 16. The input voltage to the amplifier 86 in the current source 76 is connected to the charging input to the comparator 72 and to the switching node 22 through a resistor 202, rather than driving the amplifier 86 by a voltage divider from the switching node 22 as in FIG. 2. The current source 76 may be embodied in other various configurations as desired to provide an output current that is proportional to (Vin−Von1).

The term "switching controller" is used herein to refer to the various portions of the DC to DC buck converter 10 and other DC to DC converters that control the switching of the switching node (e.g., 22). The functions of the switching controller may be distributed across various circuitry of the DC to DC buck converter 10. For example, a switching controller may include portions of the on-time timer 50, high-side driver 52, low side driver 54, cross-conduction controller 62, zero-crossing comparator 64 and associated logic such as the SR latch 116 and zero crossing SR latch 132. For example, it may also include a minimum off-time timer if the switch has a high-side NMOS transistor, requiring that a capacitor be charged during the minimum off-time to drive the high-side NMOS transistor. Additionally, the term "modulator" generally refers to modulation or switching circuitry. For example, modulator can include loop comparator 34, drivers 52 and 54, latch 116, cross conduction control 62, and any intermediate logic or components.

It is important to note that the equations and proportionalities set forth and claimed herein are ideal and do not explicitly take into consideration other effects such as ripple in the output voltage, current or propagation delay of each circuit. However, the disclosed and claimed equations and proportionalities apply to actual circuits that include these effects. In other words, the existence of output ripple does not prevent a circuit from conforming to the disclosed and claimed equations and proportionalities, and propagation delay can be cancelled by proper delay compensation circuitry.

Figure 5:
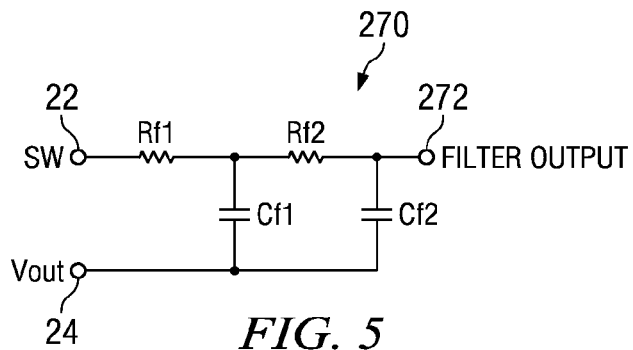
FIG. 5 depicts an embodiment of a switch node voltage filter.

Turning now to FIG. 5, another embodiment of a switch node voltage filter 270 is illustrated that may be used in place of the Vsw filter 80. In this embodiment, the switch node voltage filter 270 references Vout 24 instead of ground 20 to filter the voltage level of the switching node 22. The switch node voltage filter 270 is a low pass filter that passes low frequency components of the voltage level of the switching node 22 at the filter output 272, which is connected to the non-inverting input of the comparator 72. As with the Vsw filter 80, the switch node voltage filter 270 may comprise any desired components to form a low pass filter.

Figure 6:
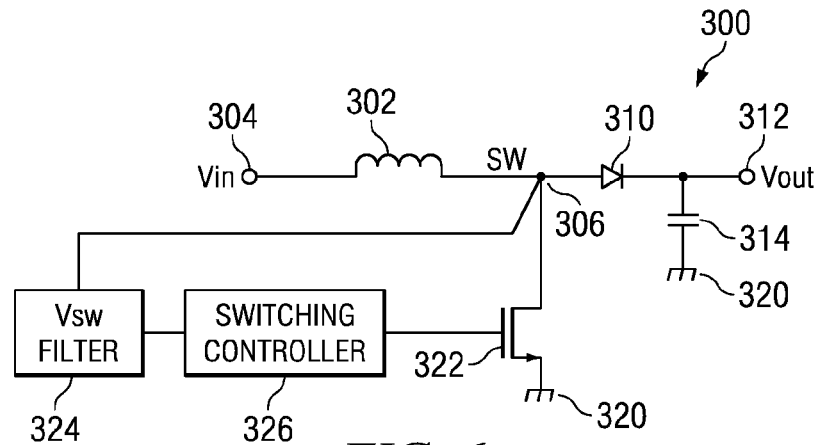
FIG. 6 depicts an example of a DC to DC boost converter with a pseudo constant switching frequency.

The application of a pseudo constant switching frequency is not limited to the DC to DC buck converter 10 described above, but may be adapted to other types of DC to DC converters. For example, as illustrated in FIG. 6, a DC to DC boost converter 300 may adapted to switch at a pseudo constant frequency. In this embodiment, an inductor 302 is connected between an input Vin 304 and a switching node 306. A diode 310 is connected between the switching node 306 and an output Vout 312. A capacitor 314 is connected between the output Vout 312 and ground 320. A switch 322 such as a MOSFET is connected between the switching node 306 and ground 320. A Vsw filter 324 is connected to the switching node 306, and a switching controller 326 is connected to a control input on the switch 322 and to the Vsw filter 324. During an on-time, the switch 322 is turned on, and during an off-time, the switch 322 is off and the diode 310 conducts and deliver current to the output Vout 312.

Assuming that the on resistance of the switch 322, diode 310, and the parasitic resistance DCR of the inductor 302 are all low enough to be ignored, and the output capacitance is large enough and the voltage of the output Vout 312 can be considered as a constant, the equations below may be derived:

$$I1 = I0 + Ton*Vin/L \tag{11}$$

$$I2 = I1 - Toff*(Vout - Vin)/L \tag{12}$$

Where
I0: inductor current at a beginning of an on-time
I1: inductor current at the end of the on-time
I2: inductor current at the end of the off-time
Ton: on-time
Toff: off-time During steady state operation, the current I2 through the inductor 302 at the end of the off-time should equal the current I0 through the inductor 302 at the start of an on-time, leading to the following equation:

$$Ton*Vin = Toff*(Vout - Vin) \tag{13}$$

$$Ton + Toff = Toff*Vout/Vin \tag{14}$$

According to the equation (14), it is possible to keep the switching period (Ton+Toff) as a constant by changing Toff proportional to Vin 304 and inversely proportional to Vout 312. Note that Vout is representative of the voltage of the switching node voltage during the off state. In actuality, the on resistance of the switch 322, diode 310, and the parasitic resistance DCR of the inductor 302 are not negligible and equations (13) and (14) are modified as follows:

$$I1 = I0 + Ton*(Vin - Von1 - Vdcr1)/L1 \tag{15}$$

$$I2 = I1 - Toff*(Vout - Vin + Von2 + Vdcr2)/L1 \tag{16}$$

Where
Von1: average voltage across the switch 322 during on-time
Von2: average voltage across the diode 310 during off-time Vdcr1: average voltage across DCR of inductor 302 during on-time Vdcr2: average voltage across DCR of inductor 302 during off-time During steady state operation, the current I2 through the inductor 302 at the end of the off-time should equal the current I0 through the inductor 302 at the start of an on-time. Also, the average voltage Vdcr1 across the DCR of inductor 302 during the on-time should be the same as the average voltage Vdcr2 across the DCR of inductor 302 during the off-time because the average current during the on-time is equal to the average current during the off-time through the inductor 26. The following equations are therefore derived from equations (15) and (16):

$$Ton*(Vin-Von1-Vdcr)=Toff*(Vout-Vin+Vdcr+Von2) \quad (17)$$

$$Ton+Toff=Toff*(Vout+Von2-Von1)/(Vin-Vdcr-Von1) \quad (18)$$

Where

Vdcr=Vdcr1=Vdcr2

Thus, the timing capacitor in the off-time timer of the switching controller 326 is charged with a current proportional to (Vout+Von2−Von1), and the on-time is terminated when the voltage across the timing capacitor becomes (Vin−Vdcr−Von1) to achieve pseudo fixed frequency operation.

The voltage of (Vout+Von2) can be obtained from the voltage at the switching node 306 during the off-time. The voltage of (Vin−Vdcr) can be obtained by averaging the voltage at the switching node 306. Note that Vin can be used as a representative (Vin−Vdcr) if the Vdcr is small enough compared to Vin. The voltage of (Von1) can be obtained from the voltage at the switching node 306 when the switch 322 is on. Von1 is usually small compared to (Vout+Von2) and may be ignored with small error. It is therefore possible to achieve pseudo constant switching frequency boost converter by setting the off-time as follows:

Discharge off-time timing capacitor to the voltage (Von1) of the switching node 306 during the on-time At the start of the off-time, charge the timing capacitor with a current proportional to the voltage of the switching node 306, or (Vout+Von2)

Terminate the off-time when the voltage of the timing capacitor reaches the averaged voltage of the switching node 306, or (Vin−Vdcr)

The off-time can thus be controlled proportional to (Vin−Vdcr−Von1) and inversely proportional to (Vout+Von2). The voltage information required for pseudo fixed frequency off-time generation in the DC to DC boost converter 300 can be obtained from the voltage at the switching node 306. It is possible to discharge off-time timing capacitor to GND if (Von1) is small enough compared to (Vin−Vdcr).

Figure 7:
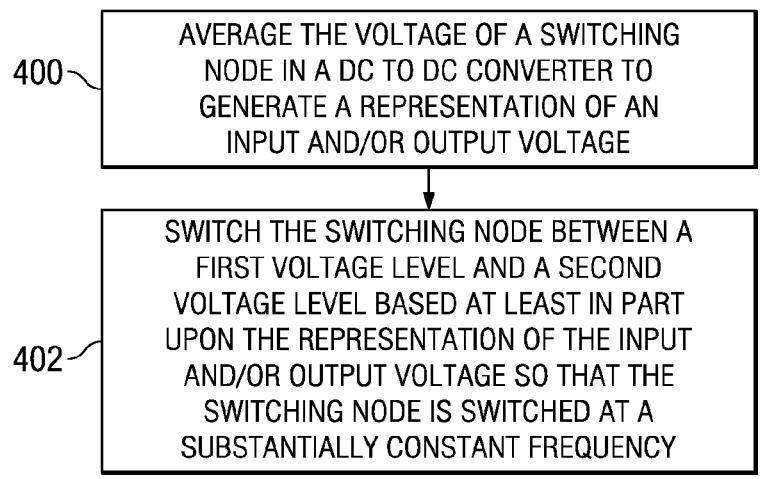
FIG. 7 depicts a flow chart of a method of converting DC to DC signals.

Referring now to FIG. 7, a method for converting DC to DC signals will be summarized. The voltage of a switching node in a DC to DC converter is averaged to generate a representation of an output voltage for a buck converter or an input voltage for a boost converter. (Block 400) This output or input voltage is also referred to herein as a boundary voltage. The switching node is switched between a first voltage level and a second voltage level based at least in part upon the representation of the voltage so that the switching node is switched at a substantially constant frequency. (Block 402) Various embodiments of the method may also include charging an energy storage device such as a capacitor during an on-time and discharging the energy storage device during an off-time, wherein the energy storage device is charged with a current that is proportional to a difference between an input voltage level and a voltage level across a high side switch. The method may also include comparing the representation of the output voltage with a voltage level of the energy storage device, wherein the switching node is switched when a result of the comparing changes state. No connection to the input and output voltage nodes is needed to achieve a pseudo constant switching frequency, saving space in an integrated circuit. Most error factors which affect on the switching frequency in the DC to DC converter can be compensated for so that an almost constant switching frequency may be achieved, independent of load current, input or output voltage. The pseudo constant switching frequency may be applicable in various types of DC to DC converters.

While illustrative embodiments have been described in detail herein, it is to be understood that the concepts disclosed herein may be otherwise variously embodied and employed.

What is claimed is:

1. A method of converting DC to DC signals, the method comprising:

averaging a voltage of a switching node in a DC to DC converter to generate a representation of a boundary voltage; and switching the switching node between a first voltage level and a second voltage level based at least in part upon the representation of the boundary voltage, wherein the switching node is switched at a substantially constant frequency, wherein the DC to DC converter comprises a boost converter and said boundary voltage comprises an input voltage and the switching node comprises a node between a first switch to an output node and a second switch to ground, and wherein said switching the switching node comprises turning the first and second switches on and off;

further comprising:

charging an energy storage device during an off-time and discharging the energy storage device during an on-time, wherein the energy storage device is charged with a current that is proportional to a combination of an output voltage and a voltage difference between the switching node and the output voltage;

terminating the charging when the voltage level of the energy storage device reaches the averaged voltage of the switching node; and comparing the representation of the input voltage with a voltage level of the energy storage device, wherein the switching node is switched when a result of the comparing changes state.

2. The method of claim 1, wherein said charging is terminated when the voltage level of the energy storage device reaches a termination voltage level, the termination voltage level comprising a combination of the output voltage and a voltage level across an output inductor.

3. The method of claim 2, the termination voltage level further including a voltage level across a low side switch.

4. A method of converting DC to DC signals, the method comprising:

averaging a voltage of a switching node in a DC to DC converter to generate a representation of a boundary voltage; and switching the switching node between a first voltage level and a second voltage level based at least in part upon the representation of the boundary voltage, wherein the switching node is switched at a substantially constant frequency, wherein the DC to DC converter comprises a buck converter and said boundary voltage comprises an output voltage and the switching node comprises a node between a high side switch and a low side switch, and wherein said switching the switching node comprises turning the high side switch and the low side switch on and off;

further comprising:

charging an energy storage device during an on-time and discharging the energy storage device during an off-time, wherein the energy storage device is charged with a current that is proportional to a difference between an input voltage level and a voltage level across the high side switch; and comparing the representation of the output voltage with a voltage level of the energy storage device, wherein the switching node is switched when a result of the comparing changes state.

* * * * *